(12) United States Patent
Tofighbakhsh et al.

(10) Patent No.: US 8,442,510 B2
(45) Date of Patent: May 14, 2013

(54) MOBILE POINT-OF-PRESENCE FOR ON DEMAND NETWORK CLIENT SERVICES AND SECURITY

(75) Inventors: Mostafa Tofighbakhsh, Cupertino, CA (US); David R. Wolter, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 724 days.

(21) Appl. No.: 12/576,470

(22) Filed: Oct. 9, 2009

(65) Prior Publication Data

US 2011/0088028 A1    Apr. 14, 2011

(51) Int. Cl.
*H04W 24/00*    (2009.01)

(52) U.S. Cl.
USPC ........... 455/419; 717/168; 717/169; 717/170; 717/171

(58) Field of Classification Search .......... 717/168–178; 455/419
See application file for complete search history.

(56) References Cited

U.S. PATENT DOCUMENTS

| | | | |
|---|---|---|---|
| 6,144,849 A | 11/2000 | Nodoushani | |
| 6,785,255 B2 | 8/2004 | Sastri | |
| 2005/0055689 A1* | 3/2005 | Abfalter et al. | 717/174 |
| 2006/0221913 A1 | 10/2006 | Hermel | |
| 2006/0223515 A1 | 10/2006 | Hermel | |
| 2006/0276173 A1* | 12/2006 | Srey et al. | 455/410 |
| 2007/0042766 A1* | 2/2007 | Herle | 455/419 |
| 2007/0169093 A1* | 7/2007 | Logan et al. | 717/168 |
| 2007/0256071 A1* | 11/2007 | Jung et al. | 717/174 |
| 2008/0132219 A1 | 6/2008 | Bisdikian | |
| 2009/0260004 A1* | 10/2009 | Datta et al. | 717/175 |
| 2010/0058306 A1* | 3/2010 | Liles et al. | 717/168 |
| 2010/0211941 A1* | 8/2010 | Roseborough | 717/170 |

FOREIGN PATENT DOCUMENTS

EP    1283995 B1    11/2003

OTHER PUBLICATIONS

Erik L. Org et al, "Software Defined Radio Architectures for Mobile Commercial Applications", http://www.bitwavesemiconductor.com/pdf/softransceiver-architectures.pdf , accessed on Sep. 20, 2009.
Shafiullah Khan et al, "Denial of Service Attacks and Challenges in Broadband Wireless Networks", IJCSNS International Journal of Computer Science and Network Security, vol. 8, Issue No. 7, published Jul. 2008.

* cited by examiner

*Primary Examiner* — Kamran Afshar
*Assistant Examiner* — Sayed T Zewari
(74) *Attorney, Agent, or Firm* — Hartman & Citrin LLC

(57) ABSTRACT

Devices, systems and methods are disclosed which relate to implementing a point-of-presence system on a mobile service network. Such a point-of-presence system includes a mobile device communications network; a mobile device; a point-of-presence logic installed on a mobile device; and an application server in communication with the point-of-presence logic via the communications network. Communications between the point-of-presence logic and the network and application server include network data, configuration, and/or installation of connection and device management applications. This point-of-presence system constitutes a mechanism for the service provider to best optimize network resources, even at the device level, while providing optimum network service to mobile users—even for mobile devices that have not been pre-configured for the mobile service network.

20 Claims, 7 Drawing Sheets

MOBILE POINT-OF-PRESENCE FOR ON DEMAND NETWORK CLIENT SERVICES AND SECURITY

BACKGROUND OF THE INVENTION

1. Field of the Invention

The present invention relates to the field of communications networks. In particular, the present invention relates to methods, systems, and devices that enable device-level and network-level network operator control.

2. Background of the Invention

Erroneous mobile device behavior can compromise user data, corrupt billing records, or even congest network resources denying or degrading data and voice service to users. Examples of such behavior include tampering with device firmware to allow the user to place an unbilled phone call or mobile device infection by a virus which causes it to take part in a distributed denial of service attack on a server. As well, the wireless communications networks frequently used by mobile devices add new challenges in network performance not sufficiently accounted for by protocols designed with wired networks in mind.

Traditionally, there has been a link between mobile devices and mobile service providers. For example, the iPhone™ is only available in the United States for use on the AT&T™ mobile service network. Typically, a user purchases a service plan from a mobile service provider and is presented with a choice of mobile devices configured by the mobile service provider for that service plan.

Increasingly, however, users desire the freedom to choose a mobile device independently from their choice of mobile service provider. As mobile devices become more complex, it makes more sense for users to keep their mobile devices even if they desire to switch their mobile service providers. Such a consideration was less important when the difference in handsets was mainly cosmetic. Currently, so much personal data is present on these devices that switching devices can require significant effort. In addition, when mobile service providers need to specifically configure mobile devices for their network, mobile service providers are forced to have to deal with thousands of mobile device and operating system vendors. This necessity means that introducing new services and network features to their users is that much more tortuous. Such considerations have given rise to the proliferation for sale of "unlocked" devices, i.e., devices not tied by some means to work only with a particular mobile service provider.

While they provide opportunities to users and mobile service providers, the proliferation of such devices can pose increased threats to communications networks maintained by service providers. When a mobile service provider configures a mobile device before allowing it to operate on its mobile service network, it has, for example, the opportunity to install device identification, performance monitoring, and troubleshooting software directly into the mobile device. Furthermore, as the standard operating system software, such as Symbian, generally found on unlocked devices displaces the proprietary software heretofore found on non-unlocked mobile devices, the ability of a virus to create a mass infection of mobile devices becomes that much greater.

Thus there is a need for systems, methods, and devices that allow mobile service providers to monitor and control mobile devices even when they have not been pre-configured to operate on the mobile service network.

SUMMARY OF THE INVENTION

The present invention discloses systems, methods, and devices implementing a point-of-presence system on a mobile service network. Such a point-of-presence system comprises a mobile device communications network, a mobile device, a point-of-presence logic installed on a mobile device, and an application server in communication with the point-of-presence logic via the communications network. Communications between the point-of-presence logic and the application server include network data, configuration, and/or installation of connection and device management applications. This point-of-presence system constitutes a mechanism for the service provider to best optimize network resources, even at the device level, while providing optimum network service and quality of experience to mobile users.

In an exemplary embodiment of a point-of-presence system, communications between the point-of-presence logic and the application server implement the initial configuration of an off-the-shelf mobile device. This enables the mobile device to connect to the mobile service network, the application server to remotely diagnose device function including problems with its connection to the network, the application server to perform customer service transactions for the user of the mobile device, dynamic optimization of the network connection including optimization based on user behavior and or applications in use on the mobile device, and implementation of security protocols when an attack on the device or the network is detected or anticipated.

In one exemplary embodiment, the present invention is a mobile device. The mobile device includes a microprocessor, a memory in communication with the microprocessor, a point-of-presence logic stored in the memory, or on a smart card coupled to the mobile device, and a transceiver in communication with the point-of-presence logic via the microprocessor. The point-of-presence logic constitutes a mechanism for the service provider to best optimize resources on a communications network, even at the device level, while providing optimum network service.

In another exemplary embodiment, the present invention is a point-of-presence system. The point-of-presence system includes a communications network, a mobile device connected to the communications network, an applications server connected to the communications network, and a point-of-presence logic running on the mobile device. The point-of-presence logic optimizes the mobile device's connection to the communications network based on a plurality of data received from the applications server.

In yet another exemplary embodiment, the present invention is a mobile device. The mobile device includes a microprocessor, a memory in communication with the microprocessor, a point-of-presence logic stored in the memory, and a transceiver in communication with the point-of-presence logic via the microprocessor. The point-of-presence logic constitutes a mechanism for the service provider to best optimize resources on a communications network, even at the device level, while providing optimum network service. The memory may be part of a smart card coupled to the mobile device.

DETAILED DESCRIPTION OF THE INVENTION

Figure 1:
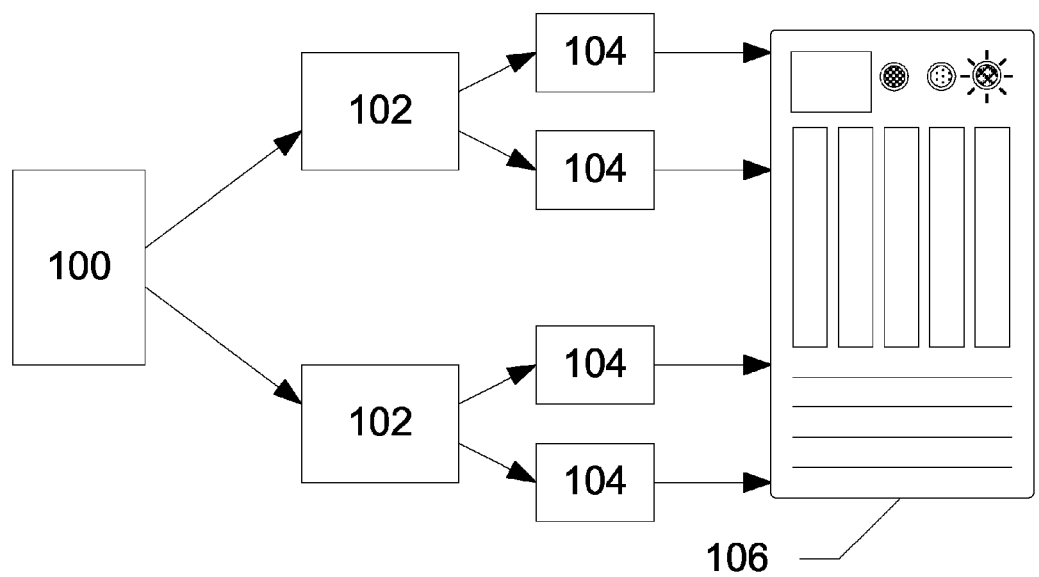
FIG. 1 displays a schematic diagram of a distributed denial of service attack.

The present invention discloses systems, methods, and devices implementing a point-of-presence system on a mobile service network. Such a point-of-presence system comprises a mobile device communications network; a mobile device; a point-of-presence logic installed on a mobile device; and an application server in communication with the point-of-presence logic via the communications network. Communications between the point-of-presence logic and the application server include network data, configuration, and/or installation of connection and device management applications. This communication can occur via a closed loopback protocol. This point-of-presence system constitutes a mechanism for the service provider to best optimize network resources, even at the device level, while providing optimum network service to mobile users. The point-of-presence logic may be stored on a memory on a smart card that is removably coupled to the mobile device.

In an exemplary embodiment of a point-of-presence system, communications between the point-of-presence logic and the application server implement the initial configuration of an off-the-shelf mobile device. This enables the mobile device to connect to the mobile service network, the application server to remotely diagnose device function including problems with its connection to the network, retrieve local performance statistics collected on the device, the application server to perform customer service transactions for the user of the mobile device, dynamic optimization of the network connection including optimization based on applications, real-time and historical user behavior in use on the mobile device, and implementation of security protocols when an attack on the device or the network is detected or anticipated.

As used herein and throughout this disclosure, a "mobile device" refers to any information-processing portable device able to maintain a connection to a network through which it exchanges information with other entities, or a fixed-location device using the wireless network for its communication. Examples of acceptable mobile devices by this definition include smartphones, personal data assistants (PDAs), laptop computers, netbooks, cellular telephones, etc., as well as fixed wireless terminals such as vending machines, point-of-sale terminals, etc.

As used herein and throughout this disclosure, "configuration" of such a mobile device for a communications network refers to installation of software on the mobile device, or enablement of pre-existing software on a smart card coupled to the mobile device, setting of mobile device parameters, and/or registration of the mobile device with the operator of the communications network so the mobile device is able to operate on the communications network. As used herein and throughout this disclosure "pre-configuration" of such a mobile device for a communications network refers to configuration of the mobile device for the communications network at the time of its manufacture or before the purchase of the device by its user specifically for that communications network. In some cases, pre-configuring the device in this manner includes installing identification, security, and connection management software. As used herein and throughout this disclosure, such a mobile device is said to be "off-the-shelf" with respect to a given communications network if it has not undergone pre-configuration for that communications network. As used herein and throughout this disclosure, to "attack" such a mobile device refers to a deliberate communication by a third party (neither the user of the device nor the operator of the communications network) to the mobile device which causes the mobile device to malfunction or causes other entities to malfunction. By this definition, examples of such attacks include installing viruses, worms, or Trojan Horses on the mobile device, or causing the device to participate in a distributed denial of service attack.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

For context, FIG. 1 displays a schematic diagram of a distributed denial of service attack. In an exemplary embodiment of the present invention, a point-of-presence system curtails the effectiveness of such an attack. In such an attack, an attacking computer 100, through, for example, installation of malicious software, causes a plurality of handler computers 102 to infect a plurality of compromised computers 104 so that at the command of attacking computer 100, compromised computers 104 flood a target server 106 with requests for service. Such attacks so congest the network of which target server 106 is a part that they effectively deny legitimate requests from other entities for service by target server 106 or simply so overwhelm it that its software crashes.

Figure 2:
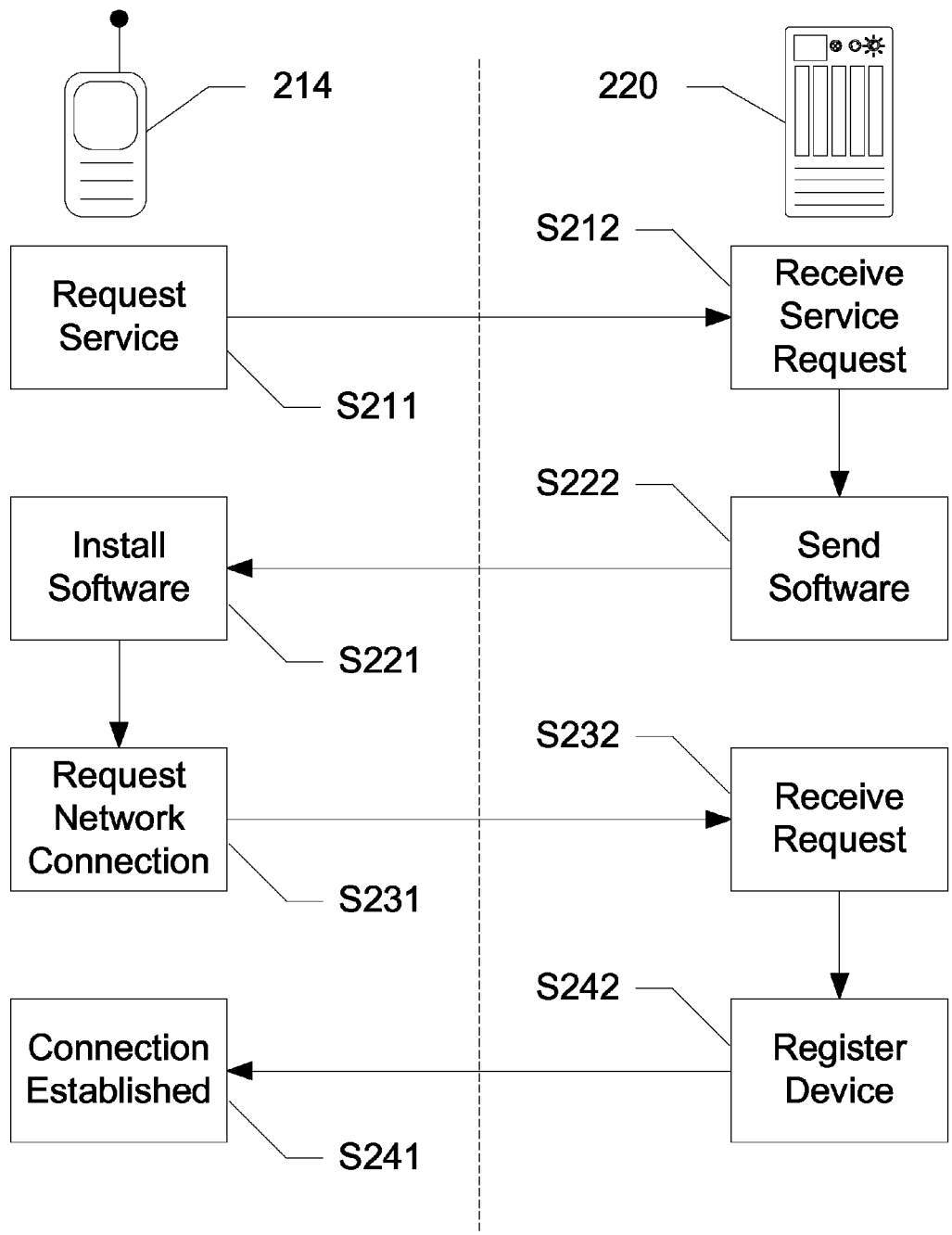
FIG. 2 displays a flow chart of a method for the configuration of a mobile device for connection to a mobile service network, according to an exemplary embodiment of the present invention.

FIG. 2 displays a flow chart of a method for the configuration of a mobile device for connection to a communications network in one exemplary embodiment of the present invention. In this embodiment, this configuration happens "over the air", i.e., via one or more wireless connections between the mobile device and the communications network. In this embodiment, the method begins when the user requests a particular type of service on the communications network through a web portal, S211. Such a request includes selection by the user of a specific Service Level Agreement (SLA) and identification and billing details for the user. The method can additionally include a determination of an optimum Quality of Experience (QoE) achievable by the network for the user under a specific set of conditions. The operator of the communications network receives the request or the determination of QoE, S212 and sends to the mobile device a plurality of network element software and configuration parameters, S222. This plurality of network element software includes applications for transcoding, compression, codecs, the presentation stack, and security. The mobile device receives this plurality of network element software and configuration parameters, installs the software, and optimizes mobile device hardware and software according to the configuration parameters, S221. Access to the services of the network by the mobile device is restricted or limited until the installation step is complete. Thus, the mobile device may have limited connectivity for the purpose of installing the software via the network or other means, before it is able to avail of the services offered by the network. In this embodiment, this plurality of network element software implements a plurality of standard, communications-network managed objects through which the network operator is able to perform remote diagnostics of the mobile device condition, including its connection to the communications network, and customer service functions. The mobile device then makes a request for a connection to the communications network, S231. The operator of the communications network receives the request S232 and registers the mobile device on the communications network S242, establishing the mobile device on the communications network, S241.

In an alternative embodiment of the present invention, instead of the mobile device itself accessing the web portal to begin its configuration for the communications network, a distinct computing entity, such as a desktop computer in communication with the mobile device, accesses the web portal to initiate the configuration of the mobile device via the communication between the mobile device and the distinct computing entity. In another alternative embodiment, instead of the configuration of the mobile device for the communications network occurring over-the-air, the user of the mobile device configures the mobile device for the communications network by plugging a USB dongle storing a program that, when run by the user of the mobile device, installs the plurality of network element software and tunes mobile device hardware and software according to the configuration parameters. In yet another alternative embodiment, the user of the mobile device configures the mobile device for the communications network by installing into an appropriate slot of the mobile device a smart SIM card, such as a Universal Integrated Circuit Card (UICC), which implements a program that installs the plurality of network element software and tunes mobile device hardware and software according to the configuration parameters. In this embodiment, the plurality of network element software and configuration parameters are either stored on the UICC itself or the UICC directs the mobile device to make a connection to a remote server from which the mobile device downloads the required network element software and configuration parameters.

Figure 3:
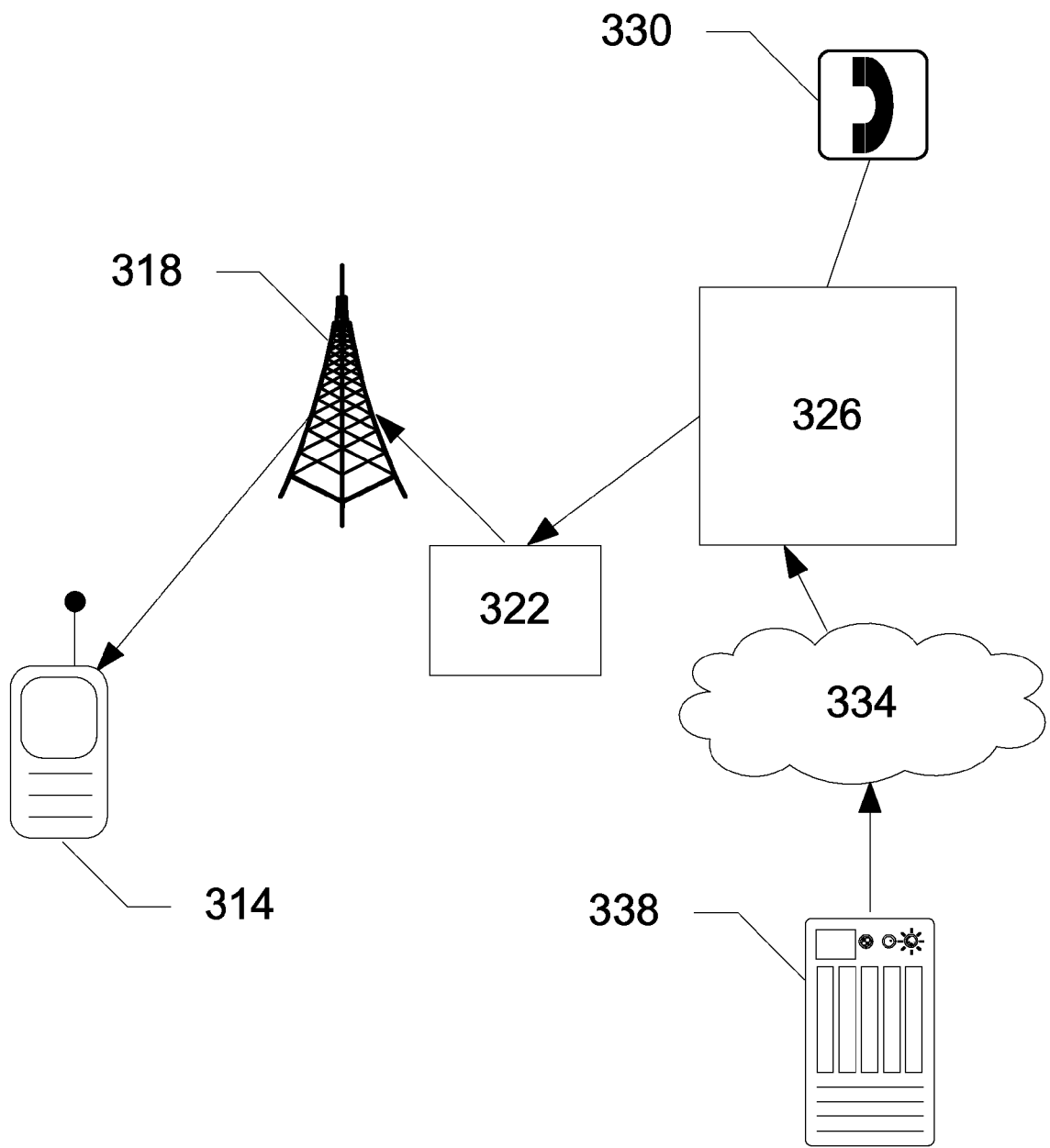
FIG. 3 displays a schematic diagram of the flow of information over the network and the mobile device in a point-of-presence system during communications between the pointof-presence logic on the device and the applications server, according to an exemplary embodiment of the present invention.

FIG. 3 displays a schematic diagram of the flow of information over a communications network in a point-of-presence system during communications between a mobile device 314 and an applications server 338 in one exemplary embodiment of the present invention wherein applications server 338 makes a request to mobile device 314. The communications network includes mobile device 314, a network access point 318, a network access point management controller 322, a core network infrastructure 326 through which the mobile device is able to be connected to a public switched telephone network (PSTN) 330 and a wide area network 334, and an applications server 338. In this embodiment, wide area network 334 is the INTERNET or any private IP/packet-based network operated by a service provider. According to this embodiment, a request is generated in application server 338 and transferred via wide area network 334 to core network infrastructure 326. Core network infrastructure 326 switches the request to network access point 318, to which mobile device 314 is connected, via network access point management controller 322.

In a further embodiment of the present invention, the communications from the application server to the mobile device constitute a request to the point-of-presence logic on the device to transfer the information contained in the public and private device level management information bases (MIBs) to the application server. As a result of this request, the point-of-presence logic, acting as an agent for the network and application server, sends the requested information to the application server so the application server is able to decide if any adjustments or limitations need to be made in the connection between the mobile device and the communications network.

Figure 4:
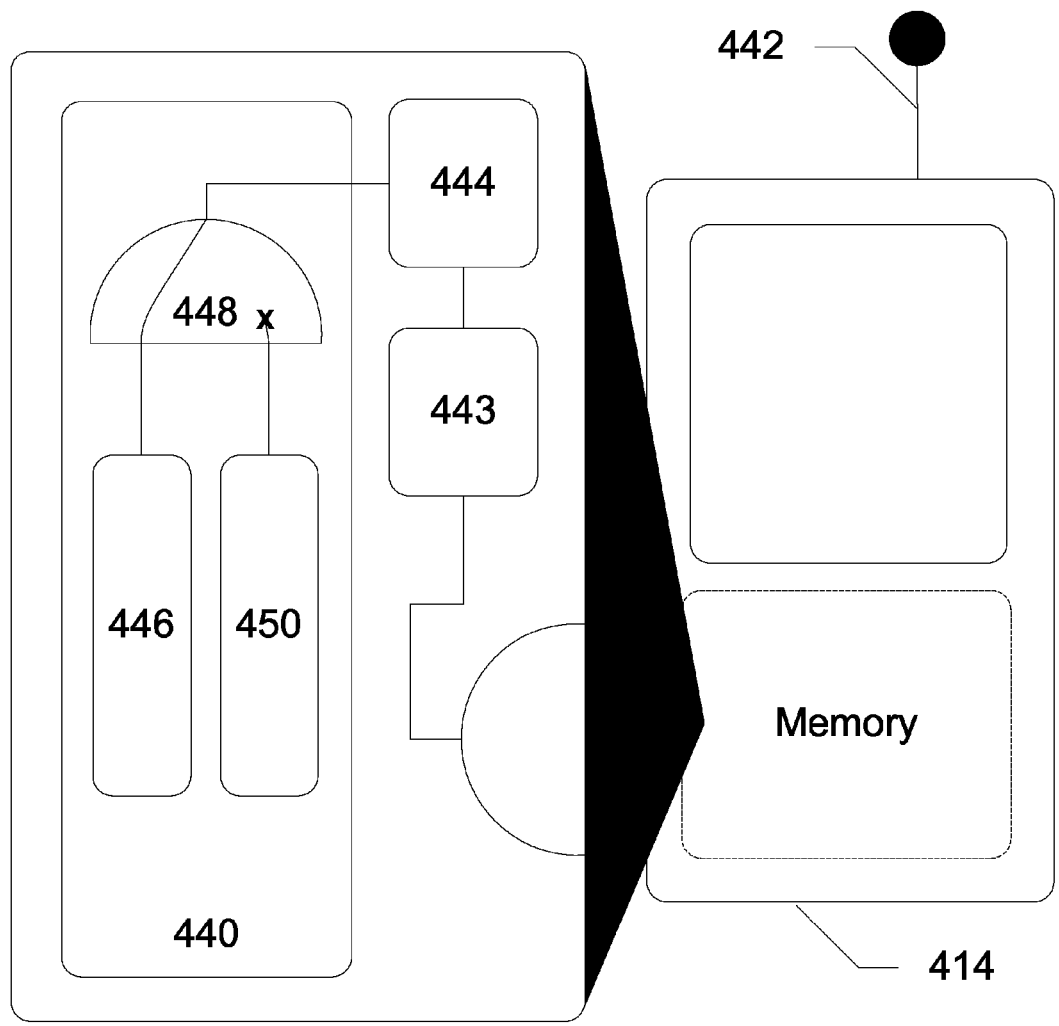
FIG. 4 displays a schematic diagram illustrating the flow of information over software and hardware elements of the mobile device in communication with the application server, according to an exemplary embodiment of the present invention.

FIG. 4 displays a schematic diagram illustrating the flow of information over software and hardware elements of a mobile device 414 in communication with an application server, according to an exemplary embodiment of the present invention. In this embodiment, mobile device 414 includes a software defined radio (SDR), or a software configurable radio. For such a device, every layer of the full set of network protocols the mobile device uses to communicate over the communications network, including the physical layer, is able to be configured via software operating on the mobile device.

In this embodiment, an antenna 442 receives a signal from the application server. A codec 443 translates this signal into signal content understandable by the software running on mobile device 414. In this embodiment, such translation includes decoding of the received signal. The signal content is then passed to the SDR application programming interface (API) 444 which, depending on the signal content, passes the signal content to the relevant applications running on mobile device 414, via operating system 440.

In this embodiment, the signal content informs point-of-presence logic 448 that mobile device 414 has been acting in an anomalous manner. In this embodiment, the applications server, comparing the usual network usage profile for the user of mobile device 414 noted a sharp increase in requests by mobile device 414 to a server which has been reported as a target for a distributed denial of service attack. Point-of-presence logic 448, as it monitors the network traffic of mobile device 414, then blocks any traffic from a plurality of mobile device applications 450 headed to the IP address of the targeted server.

In an alternative embodiment, the point-of-presence logic periodically transmits a plurality of user network usage statistics to a user profile maintained on the applications server. In that embodiment, maintenance of such a user profile aids in detecting anomalous behavior on the part of mobile device 414. In another alternative embodiment, a plurality of new network applications are downloaded from the applications server and stored on a device memory 446. In another alternative embodiment, the point-of-presence logic instructs the SDR, via the SDR API, to switch the implemented communications protocol from a GSM cellular protocol to a WIFI protocol when the point-of-presence logic detects a strong enough WIFI connection to ensure acceptable quality of service for the in-use network applications. Because every layer of communication protocols between the mobile device and the communications network is able to be configured by the point-of-presence logic, cross-layer optimization schemes are able to be implemented by the point-of-presence logic as well. Although the present embodiment is described with respect to an SDR, the present invention is not limited to SDR devices, and non-SDR devices can still perform the actions disclosed herein.

Figure 5A:
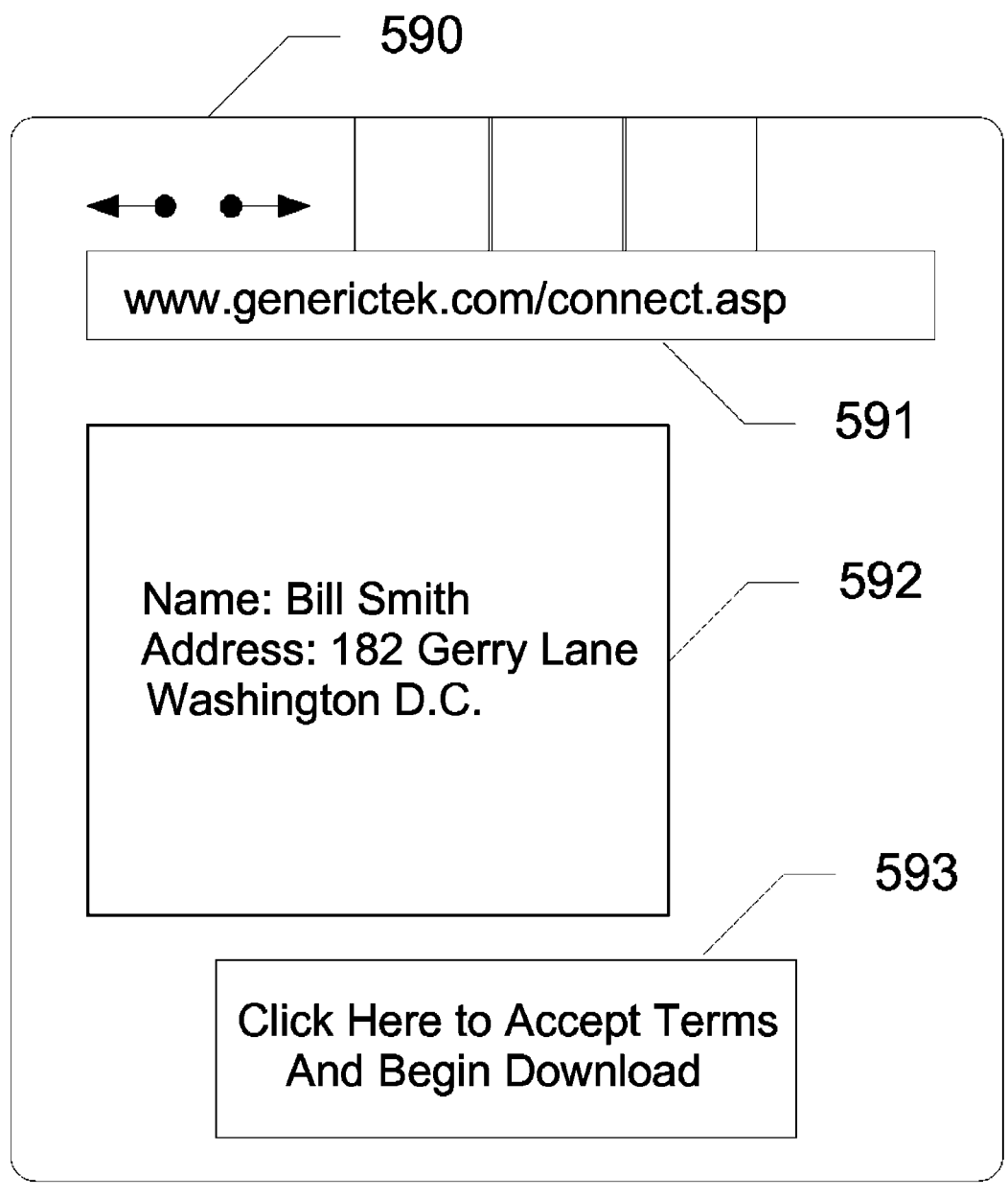
FIGS. 5A, 5B, and 5C display screenshots of a mobile device that is part of a point-of-presence system, according to an exemplary embodiment of the present invention.
Figure 5A:
Figure 5B:
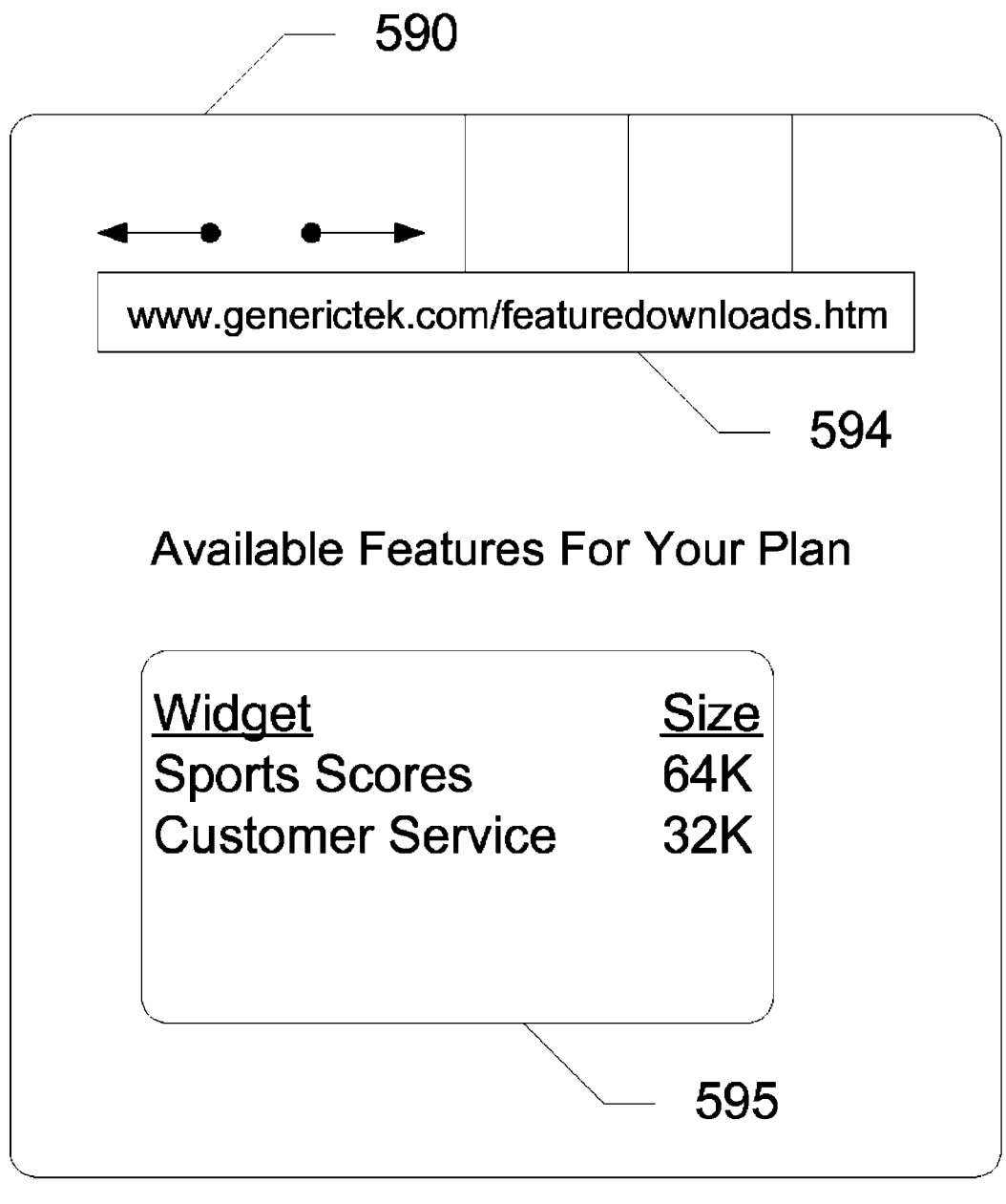
Figure 5B:
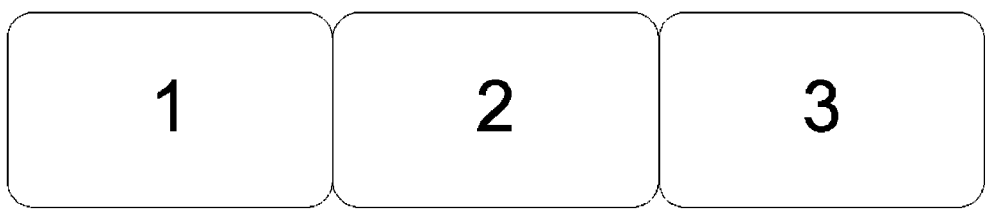
Figure 5C:
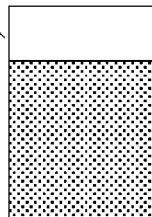

FIGS. 5A, 5B, and 5C display screenshots of a mobile device that forms part of a point-of-presence system, according to an exemplary embodiment of the present invention.

FIG. 5A displays a screenshot of a web browser 590 displaying a web portal page 591 through which a user of the mobile device is able to sign up for service on a communications network in one exemplary embodiment of the present invention. On web portal page 591, the user enters a plurality of identification information 592. The identification information includes the user's name, address, etc. The user then clicks on a download link 593 which initiates the download from the applications server to the mobile device of the necessary network element software and configuration parameters needed by the device to connect to the communications network.

In some embodiments the service sign-up page requests payment information prior to allowing the download. In further embodiments, the download link does not become active until the payment has been processed.

FIG. 5B displays a screenshot of web browser 590 displaying a network features installation page 594 via which a user of the mobile device is able to install a plurality of network management and network application features 595 to the mobile device. In this embodiment, such features act as "drag and drop" widgets so that the user is able to select the icons corresponding to the features the user desires, drag them onto the desktop of the mobile device, and then the desired features are automatically downloaded from the applications server and installed on the mobile device. In this embodiment, network management and network application features 595 include a "Sport Scores Widget", an application displaying scores of notable sporting events on the user's desktop and a "Customer Service Widget", an application acting as a portal to a customer service representative for the communications network.

Embodiments of the network feature installation pages including a wide array of applications. Those having skill in the art will recognize other applications appropriate for download.

FIG. 5C displays a screenshot of a network priority and health application 596. Network priority and health application 596 displays a list of applications 597 using the connection between the mobile device and the communications network, by rank. Higher ranked applications get higher priority in the competition for the limited bandwidth maintained by the connection between the mobile device and the connections network. In this embodiment, clicking on any application displays the bandwidth used by that application as a function of time. Dragging any application allows the user to give the application a new ranking in list of applications 597. At the bottom of network priority and health application 596, a signal strength icon 598 displays the strength of signal for the currently active wireless connection to the communications network.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method, comprising:
    utilizing an application server including at least one processor for receiving a connection request from a mobile device;
    utilizing the processor for optimizing a plurality of device hardware and software according to a plurality of configuration parameters associated with the mobile device; and
    transmitting to the mobile device an indication that a server in communication with the mobile device has been reported to be under an attack;
    wherein the mobile device includes logic for enabling the mobile device to block any communication between the mobile device and the server upon receiving the indication.

2. The method of claim 1, further comprising receiving a request for service from the mobile device, the request for service including one of a selection by the user of a specific Service Level Agreement (SLA) and identification and billing details for the user, or a determination of an optimum Quality of Experience (QoE) achievable by the network for the user under a specific set of conditions.

3. The method of claim 1 wherein the mobile device includes a software defined radio.

4. The method of claim 1 further comprising transmitting a network element software to the mobile device, the network element software including a point-of-presence logic for implementing quality of service standards for a plurality of applications running on the device.

5. The method of claim 1, further comprising remotely diagnosing a mobile device condition.

6. The method of claim 4, further comprising limiting access to the communications network until the network element software is installed on the mobile device.

7. A system comprising:
    a mobile device connected to a communications network; and
    a point-of-presence logic stored on the mobile device;
    wherein the point-of-presence logic enables a processor coupled to the mobile device to execute operations including:
        receiving, from an application server, an indication that a server in communication with the mobile device has been reported to be under an attack, the indication being received in response to the application server determining a sharp increase in requests to the server from the mobile device relative to a usual network usage profile for the mobile device, and
        blocking any communication between the mobile device and the server upon receiving the indication.

8. The system of claim 7, wherein the point-of-presence logic further enables the processor to receive information regarding threats to the communications network, overall health of the communications network, typical usage of a user of the mobile device, and current network policies in effect on the communications network.

9. The system of claim 7, wherein the mobile device includes a software defined radio.

10. The system of claim 7, wherein the mobile device downloads network applications from the application server.

11. The system of claim 7, wherein the point-of-presence logic further enables the processor to block a plurality of requests from the mobile device to the server that the application server has determined is under attack.

12. The system of claim 7, wherein the point-of-presence logic further enables the processor to implement a security protocol when the application server informs the processor that the mobile device is behaving in an anomalous manner.

13. The system of claim 7, wherein the communications network limits the connectivity of the mobile device prior to installation of the point-of-presence logic.

14. A mobile device comprising:
a microprocessor;
a memory in communication with the microprocessor; and
a point-of-presence logic stored in the memory;
wherein the point-of-presence logic is executed by the microprocessor to perform operations including:
  transmitting a request for service to an application server on a communications network,
  receiving a plurality of configuration parameters to be installed on the mobile device from the application server,
  receiving an indication that a server in communication with the mobile device has been reported to be under an attack, and
  blocking any communication between the mobile device and the server upon receiving the indication.

15. The mobile device of claim 14, wherein the memory is coupled to a smart card configured to be removably coupled to the mobile device.

16. The mobile device of claim 14, further comprising a software defined radio.

17. The mobile device of claim 14, wherein the application server provides updates to the point-of-presence logic.

18. The mobile device of claim 14, wherein the point-of-presence logic is further executed by the processor to transmit a plurality of information stored in a plurality of management information bases to the application server via the network.

19. The mobile device of claim 14, wherein the software defined radio uses one of cellular radio frequency, WiFi, or BLUETOOTH communication.

20. The mobile device of claim 14, wherein the communications network limits connectivity of the mobile device prior to installation of the point-of-presence logic.

\* \* \* \* \*